July 22, 1969     O. W. GRAVELY     3,457,423
RADIATION SENSITIVE DETECTION SYSTEM FOR SHOPPING CARTS
Filed May 14, 1968     3 Sheets-Sheet 1
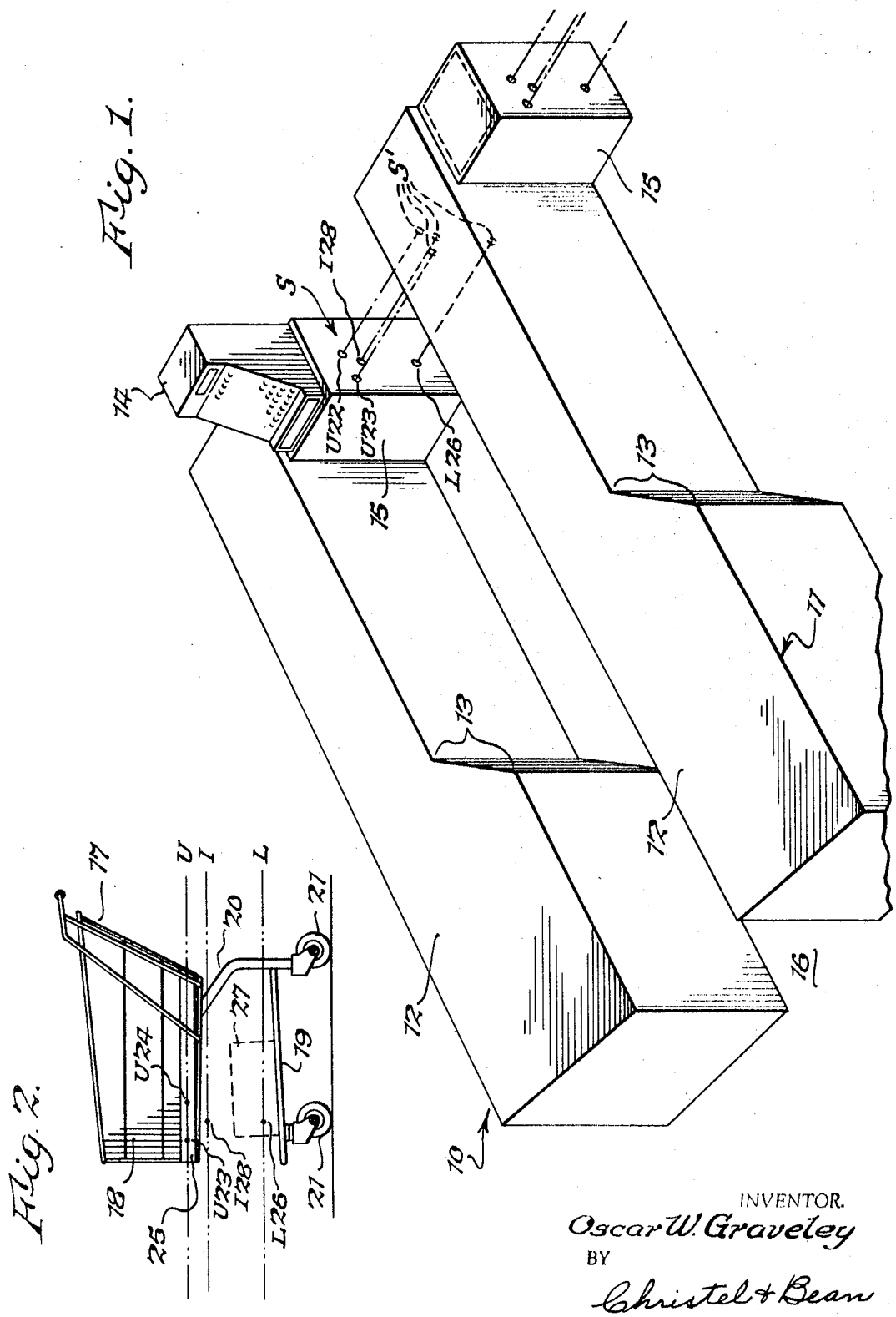
INVENTOR.
Oscar W. Graveley
BY
Christel & Bean
ATTORNEYS.

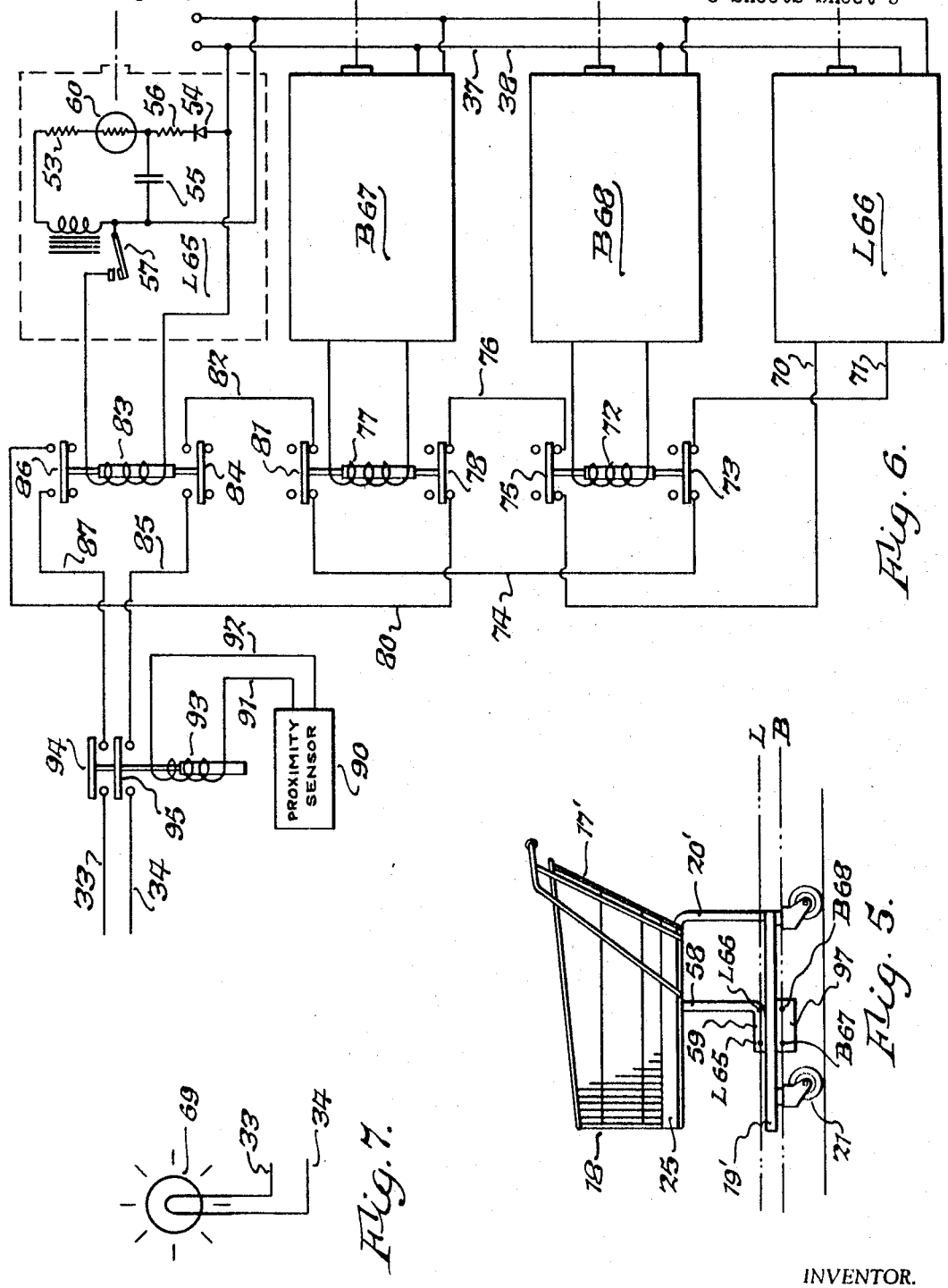

United States Patent Office 3,457,423
Patented July 22, 1969

3,457,423
RADIATION SENSITIVE DETECTION SYSTEM FOR SHOPPING CARTS
Oscar W. Gravely, Sanborn, N.Y., assignor to Niagara Frontier Service, Inc., Buffalo, N.Y.
Continuation-in-part of application Ser. No. 558,019, June 16, 1966. This application May 14, 1968, Ser. No. 742,994
Int. Cl. H01j *39/12*
U.S. Cl. 250—223          17 Claims

ABSTRACT OF THE DISCLOSURE

A system for detecting packages on the lower shelf of a market cart including sensors, actuated by the passage along an aisle of a market cart having an article on its lower shelf and also by the passage of a person along that aisle, and additional sensors actuated by the passage of a person along the aisle but not by the presence of an article on the market cart lower shelf. The sensors are arranged in controlling relation to a signal device, in a manner discriminating between passage of a cart having an article on its lower shelf and passage of a shopper, and in one case also discriminating between a cart with an article on its lower shelf and a cart without such an article. In both cases, the signal is actuated only when an article is present on the lower shelf of the cart.

This application is a continuation-in-part of my pending application Ser. No. 558,019, filed June 16, 1966, for "Detection System for Shopping Carts."

BACKGROUND OF THE INVENTION

This invention relates to detection and signalling apparatus and in particular to a new and useful apparatus for detecting articles on the lower shelf of a shopping cart as the cart passes a check-out counter and signalling the presence of such articles to the operator of the check-out counter.

Check-out counters in supermarkets or the like are normally constructed so that the operator stands on the side of the counter opposite from the aisle through which the shopper and cart pass. The counter obstructs the operator's view of the lower shelf of the cart, with the result that articles on the lower shelf often are inadvertently overlooked during the check-out process by both check-out counter operator and shopper. Also, shoppers sometimes place articles on the lower shelf of the cart with the specific intention of concealing such articles from the operator, and then engage the operator in conversation or otherwise distract him so that he will overlook such articles. This often is successful, particularly during rush hours, with the result that the store suffers a considerable financial loss.

Efforts have been made to solve this problem by positioning mirrors so that the check-out operator can see the lower shelf of the cart. However, this is effective only when the operator remembers to glance at the mirror, and if the operator forgets to look, articles on the lower shelf will go undetected. Obviously, if the operator is too busy, or otherwise distracted, he or she will either forget or not take the time to glance at the mirror, and at such times the mirror serves no useful purpose.

The problem is complicated by the need for discriminating between shopping carts which have articles on the lower shelf and those which do not, and between shopping carts and the persons pushing them through the aisle. The presence of the cart is obvious to the operator and it is the presence of an article on the lower shelf, normally hidden from view, that must be detected. Also, the detection should be unobtrusive so as not to embarrass a customer.

SUMMARY OF THE INVENTION

Accordingly, it is an object of this invention to provide apparatus for automatically detecting the presence of articles on the lower shelf of a market cart passing through a checkout area and discriminating between a market cart having an article on its lower shelf and a market cart without such article.

It is another object of this invention to provide a checkout detection apparatus for automatically detecting the presence of articles on the lower shelf of a market cart passing through a check-out area and discriminating between a cart having an article on the lower shelf and a person passing through the check-out area.

It is an object of the present invention to provide the foregoing in a detection apparatus having a signal means responsive only to a market cart having an article on its lower shelf.

Still another object of the present invention is to provide a market check-out detection apparatus having the foregoing characteristics and operable automatically to prevent further check-out procedures.

A detection apparatus of this invention is characterized by the provision of sensing means arranged to be actuated by the passage along an aisle of a shopping cart having an article on a shelf below the basket, and discriminating means responsive to actuation of the sensing means and operable to discriminate between a cart having an article on its lower shelf and a shopper, the discriminating means being arranged in controlling relation to signalling means for actuating the latter in response to the presence of an article on the lower shelf of the cart.

Various other novel features of construction and advantages inherent in the shopping cart detection and signalling apparatus of the present invention will become apparent from the following description of two illustrative embodiments thereof, considered in conjunction with the accompanyng drawings wherein like numerals represent like parts throughout the various views.

DECRIPTION OF THE DRAWING FIGURES

FIG. 1 is a fragmentary perspective view of a portion of a market check-out area incorporating a detection and signalling apparatus of the present invention;

FIG. 2 is a side elevational view of a shopping cart for use with the detection and signalling apparatus of this invention;

FIG. 5 is a side elevational view of another shopping cart, schematically indicating in conjunction therewith another sensor arrangement of this invention;

FIG. 6 is a schematic wiring diagram of a detection apparatus incorporating the sensor arrangement of FIG. 5; and FIG. 7 is a schematic illustration of another signal device.

DETAILED DESCRIPTION OF THE ILLUSTRATED EMBODIMENTS

Figure 3:
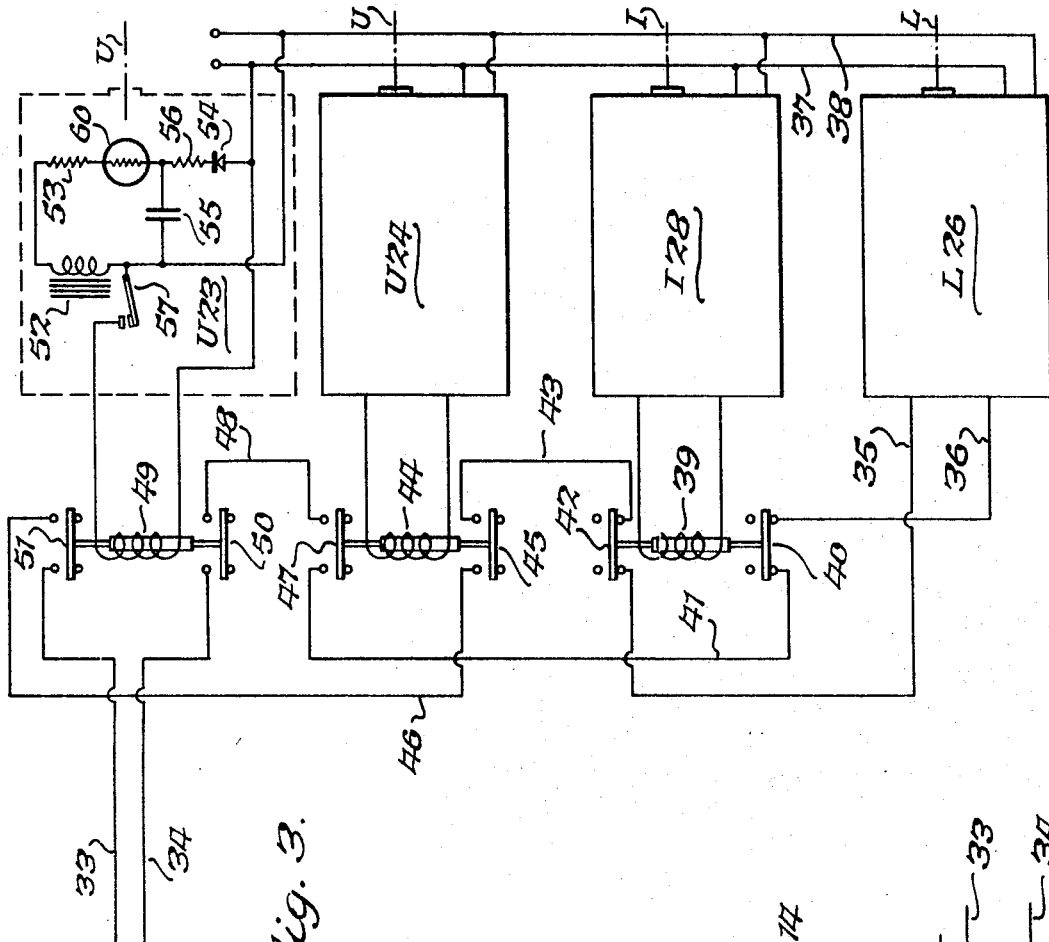
FIG. 3 is a schematic wiring diagram of the detection apparatus.

Referring now to FIG. 1, there is shown a pair of check-out counters generally designated 10 and 11, each having a main counter area 12 laterally recessed at 13 to provide a station for a cashier to operate a cash register 14 associated with that counter. Cash register 14 is supported between counter 10 including its stand 15 and counter 11. Aisle 16 has a width just sufficient for passage of a shopping cart 17 (FIG. 2) of the type having the usual basket 18 and a lower shelf 19 spaced directly therebelow, a main frame 20 connecting the basket and shelf at the rear of the cart which is mounted on wheels 21. It will be understood that the cart and check-out counter construction and arrangement thus described are conventional and that any number of check-out counters may be utilized in the practice of the present invention.

A series of sensors, generally designated S and comprising in the present instance photoelectric sensors, are provided at the side of aisle 16 adjacent the entrance thereof, being positioned for example in stand 15, with corresponding light sources S' positioned across the aisle in counter 11 in horizontal alinement with sensors S. The sensors and sources S, S' are vertically spaced above the aisle floor to provide three vertically spaced sensing levels in the sensing zone thus provided across aisle 16, the vertical spacing between the levels and their respective heights above the aisle floor bearing a particular relation to the general configuration of the illustrative cart 17 as will now be described.

An upper sensing level designed U in FIG. 2 is established by positioning a pair of photoelectric sensors U23 and U24 at a height above the aisle floor so that its beams intercept the lower side portion of the cart basket 18. To ensure that these upper level sensors U23 and U24 will be interrupted by the passage of the cart basket 18, market carts for use with the form of invention shown in FIGS. 1–3 are provided with an opaque band 25 extending along at least one side of the basket adjacent the bottom thereof. Accordingly, any cart passing through this portion of the sensing zone in aisle 16, whether or not there is a package on its lower shelf, will interrupt the upper level sensors.

A lower sensing level designated L is established by positioning a photoelectric sensor L26 and its light source at a height above the aisle floor so that its beams will extend horizontally across aisle 16 slightly above lower shelf 19 of a cart 17, in a position to be interrupted by a package or article 27 on the lower shelf. Lower level sensor L26 is spaced vertically below upper level sensors U23 and U24 so that lower sensor L26 is always in sensing position above lower shelf 19 and within the vertical confines of the cart whenever upper sensors U23 and U24 are interrupted by opaque band 25 of basket 18. Thus, a market cart having a package or article on its lower shelf will simultaneously interrupt the photoelectric beams at the upper and lower levels U and L, while a market cart without a package on its lower shelf 19 will interrupt the photoelectric beams at the upper level U only.

However, a shopper walking through the aisle may also simultaneously interrupt these photoelectric beams. To avoid this difficulty and discriminate between a shopper and a cart, an intermediate sensing level I is established by positioning a photoelectric sensor I28 and its light source between the upper and lower sensing levels U, L and at a height so that its photoelectric beam will extend horizontally across aisle 16 just below basket 18 and sufficiently above lower shelf 19 to remain uninterrupted by a package or article 27 carried by shelf 19 on a cart passing through the sensing zone. Intermediate sensor I28 is vertically alined with lower sensor L26 and is always in uninterrupted sensing position within the vertical confines of the cart whenever upper sensors U23 and U24 are interrupted by opaque band 25 of a market cart basket of the type shown in FIG. 2. Accordingly, the upper and lower level sensors will be interrupted and the intermediate level sensor will remain uninterrupted when a market cart having a package or article on its lower shelf passes through the sensing zone, and the lower and intermediate sensors will remain uninterrupted when a shopping cart without a package on its lower shelf passes through the sensing zone. A shopper would normally interrupt all three sensors.

A single sensor might instead be used at the upper level, however, to further ensure that a shopper, by crooking his leg or extending an arm and foot, will not interrupt the upper and lower level sensors and leave the intermediate level sensor uninterrupted, the upper level sensor comprises a pair of longitudinally spaced photoelectric sensors U23 and U24 which are above but horizontally offset from the lower and intermediate level sensors. In the illustrated form, sensors U23 and U24 are spaced about four inches apart and define with the lower and intermediate level sensors a narrow T-shaped sensing zone extending laterally across the aisle. Accordingly, both sensors U23 and U24 and lower sensor L26 will be interrupted and intermediate sensor I28 will remain uninterrupted when a market cart with a package on its lower shelf passes through the sensing zone.

Photoelectric sensors U23, U24, L26 and I28 are known, per se, being of any suitable type. They can be identical, whereby only one of them, namely sensor U23, is shown in detail in FIG. 3.

Each sensor comprises a photo conductive cell arranged in controlling relation to a relay 52 via load resistance 53. A rectifier 54 provides D.C. charging of condensor 55 via resistance 56, condensor 55 being discharged via the photocell 60 which becomes conductive upon interruption of the light beam impinging thereon. Energization of relay 52 in this manner closes a switch 57.

Sensors U23, L24, L26 and I28 are arranged in controlling relation to the energizing circuit of a signal device which can be of any desired form, comprising in the illustrated embodiment a solenoid having an armature 30 which, when extended, blocks the cash drawer 31 of register 14 against opening. Solenoid coil 32 is energized via leads 33 and 34 only when sensors U23, U24 and L26 are actuated and sensor I28 is not actuated, as follows.

Assume that a cart with a package on its lower shelf 19 is passed through the sensing zone across aisle 16. Lower beam L is interrupted, actuating sensor L26 to close its switch 57 and thereby connect leads 35 and 36 to A.C. supply lines 37 and 38. Immediate beam I is not interrupted and therefore sensor I28 is not actuated, leaving relay 39 in the position shown in FIG. 3. Switch 40 of relay 39 therefore connects lead 36 to lead 41, while switch 42 of relay 39 connects lead 35 to lead 43.

Both upper beams U are interrupted by the opaque band 25, thereby actuating both sensors U23 and U24. Actuation of sensor U24 energizes its relay 44, shifting its armature from the open position shown in FIG. 3 to a closed position with switch 45 connecting lead 43 to lead 46, and with switch 47 connecting lead 41 to lead 48. In like manner, sensor U23 energizes its relay 49, shifting its armature from the open position shown in FIG. 3 to a closed position with switch 50 connecting lead 48 to lead 34 and with switch 51 connecting lead 46 to lead 33.

Figure 4:
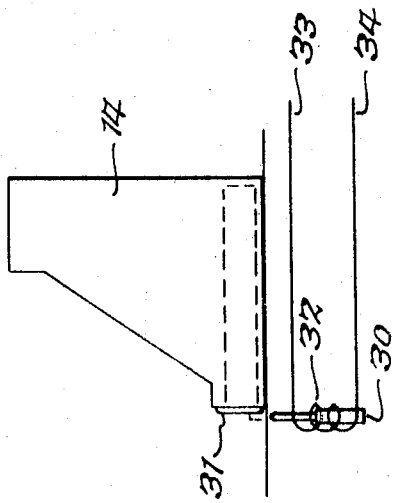
FIG. 4 is a fragmentary elevational view of a signal device associated with the cash register of a check-out counter.

Thus, with this sensing pattern, caused by the presence of a package 27 on shelf 19, signal device 30 is actuated and in the embodiment illustrated in FIG. 4 blocks the cash register drawer thereby signalling to the operator that there is an article on the cart shelf 19 to be checked. This is done unobtrusively and causes no embarrassment whatever which is important, particularly where the article thus detected turns out to be a purse or other article properly belonging to the shopper and not something which she has selected for purchase or is attempting to conceal.

If there is no article 27 on the shelf 19 sensor L26 will not be actuated and the aforesaid energizing circuit will not be completed, being interrupted at the power supply lines.

If the intermediate sensor I28 is actuated, indicating that someone or something other than a cart is passing through the sensing zone, relay 39 is shifted to open position, thereby interrupting the aforesaid signal energizing circuit.

If either of the upper level sensors U23 or U24 is not actuated, its relay 49 or 44, as the case may be, is not energized and the aforesaid signal energizing circuit therefore is not completed. The horizontal offset of sensor U24 relative to sensor L26 avoids actuation upon passage of cart frame 20.

FIGS. 5 and 6 illustrate another embodiment of my invention. This embodiment has the advantage that it is less subject than the embodiment of FIGS. 1–3 to inadvertent actuation by handbags, overcoats and other articles carried or worn by shoppers which might interrupt the lower sensor L26 when the upper sensors U23 and U24 are being interrupted by the shopping cart basket.

In this embodiment, there is provided a lower sensing level L corresponding to the lower sensing level shown in FIGS 1 and 2 but with two sensors L65 and L66 positioned at that level in horizontally spaced apart relation. The system of FIGS. 5 and 6 can be used with any conventional shopping cart, FIG. 5 showing a shopping cart 17′ slightly different from shopping cart 17 but including a basket 18 which can have the opaque band 25 but need not for purposes of this embodiment. A lower shelf 19′ is provided, the cart having a frame 20′ including a second, upright supporting member 58 having at its lower end a right angle arm 59 attached to shelf 19′. The cart is supported by wheels 21, as before.

In accordance with this embodiment, a second pair of sensors B67 and B68 are positioned at a level B below cart shelf 19′ in horizontally spaced apart relation.

Sensors L65 and L66 are positioned slightly above shelf 19′, so as to be interrupted by an article 27 (FIG. 2) on the lower shelf 19′. Sensors B67 and B68 are positioned slightly below shelf 19′ whereby they are not interrupted by the passage of such an article. Also, sensors L65 and L66, and sensors B67 and B68 are spaced apart, horizontally and lengthwise of aisle 16 a distance greater than the diameter of the cart frame 20′ and the wheel mountings, whereby only one of sensors L65 and L66 and only one of sensors B67 and B68 will be actuated at a time by passage of cart 17′. However, the relative spacing of the sensors at levels L and B is such that all of the sensors will be simultaneously interrupted by the passage of a shopper.

Sensors L65, L66, B67 and B68 can be photoelectric sensors, of conventional, known type, and can be identical with each other and with the sensors U23, U24, I28 and L26 described in the previous embodiment. Sensors L65, L66, B67 and B68 can be positioned in stand 15 with corresponding light sources S′ (FIG. 1) positioned across the aisle in counter 11, as before, and are arranged in controlling relation to the energizing circuit of a signal device which can be the signal device shown in FIG. 4. However, such signal device also can be a lamp 69 as shown in FIG. 7 adapted to be energized via leads 33 and 34 only when sensors L65 and L66 are actuated and sensors B67 and B68 are not actuated. This is accomplished as follows.

Assume that a cart 17, 17′ with a package 27 on its lower shelf 19, 19′ is passed through the sensing zone across aisle 16. The beams at level L are interrupted, actuating sensor L66 to close its switch 57 and thereby connect leads 70 and 71 to supply lines 38 and 37. The beams at level B are not interrupted, however, whereby sensors B67 and B68 are not actuated. Accordingly, relay 72 of sensor B68 remains in the closed position shown in FIG. 6, with its switch 73 connecting lead 71 to lead 74, and with its switch 75 connecting lead 70 to lead 76.

In like manner, relay 77 of sensor B67 remains in the closed position shown, wherein its switch 78 connects lead 76 to lead 80 and its switch 81 connects lead 74 to lead 82.

Sensor L65 also is actuated, energizing its relay 83 and shifting its armature from the open position shown in FIG. 6 to a closed position wherein switch 84 connects lead 82 to lead 85, and wherein switch 86 connects lead 80 to lead 87.

Shifting of relay 83 to the closed position could complete the energizing circuit to lamp 69, device 30 or whatever signal is used, without more. However, an additional control in the form of a proximity sensor 90 which can be of any conventional type adapted to be actuated by the presence of a shopping cart as distinguished from a shopper. For example, sensor 90 can be of the electromagnetic type, and actuated by the passage of a metallic shopping cart into its field.

Actuation of sensor 90 completes an energizing circuit via leads 91 and 92 to a relay 93, shifting its armature to a closed position wherein switches 94 and 95 connect leads 87 and 33, and leads 85 and 34, respectively. If the sensors L65 and L66 should be interrupted, and the sensors B67 and B68 not interrupted, by something other than a shopping cart, the proximity sensor 90 will not be actuated and the signal will not be energized.

When sensors L65 and L66 are interrupted by a shopper, sensors B67 and B68 also will be actuated. Actuation of these sensors energizes their relays 77 and 72, shifting them to open position and thereby interrupting the aforesaid circuit.

Thus, the arrangement of FIGS. 5 and 6 is responsive to the presence of a shopping cart through the proximity sensor 90, and discriminates between a shopping cart having an article on its lower shelf and a shopper, causing the signal device to be actuated only when there is an article on the lower shelf of the shopping cart.

It will be appreciated that with a sensor at level L responsive to the presence of an object on the lower cart shelf, the essential thing is to discriminate between a cart with an object on its lower shelf and a shopper. Therefore, the inclusion of a cart responsive sensor 90 means that the sensors at level B could be omitted. Conversely, with sensors at level B as well as level L, proximity sensor 90 could be omitted. However, the provision of sensor 90 in combination with sensors at levels L and B provides greater sensitivity and reliability.

The cart 17 of FIG. 2 can be used with the arrangement of FIG. 5, as can many other forms of shopping carts. Where the lower shelf 19 is inclined, the levels L and B need only be spaced slightly further apart, to accommodate such inclination. The cart 17′ shown in FIG. 5 differs from many because of the presence of arm 59, and it will be noted that passage of arm 59 can interrupt sensors L65 and L66 simultaneously. To discriminate between this situation and that caused by interruption of sensors L65 and L66 by an object on the lower shelf I provide an opaque member 97 depending from shelf 19′ and positioned to interrupt sensors B67 and B68 when sensors L65 and L66 are being interrupted by arm 59. In other words, the sensors at the two levels L and B are vertically alined, and the opaque, interrupting member 97 is alined with leg 58 and its arm 59, having substantially the same horizontal dimension. Therefore, passage of arm 59 will not actuate the signal, whereas the presence of an article on the shelf, extending in front of or behind arm 59, will.

While photoelectric sensors are specifically referred to herein, it is contemplated that other radiation sensitive sensing devices can be used at U23 and U24, I28, L26 and L65 and L66, and at B67 and B68.

Thus, it is seen that my invention fully accomplishes its intended objects, discriminating between a shopping cart and a person, and between a cart having an object on the lower shelf and one which does not, giving the signal only upon the presence of such an object. While I have disclosed and described in detail but two embodiments of my invention, that has been done by way of illustration only without thought of limitation.

Having fully disclosed and completely described my invention, and its mode of operation, what I claim as new is:

1. In a system for detecting packages on the lower shelf of a market cart having a basket and a shelf below the basket comprising means defining an aisle for the passage of such market carts, signal means, radiation sensitive sensing means arranged beside said aisle to be actuated by the passage along said aisle of an article on the shelf of such a market cart, means responsive to actuation of said sensing means and operable to discriminate between a market cart without such article and a market cart with such article, said discriminating means being arranged in controlling relation to said signal means to actuate the latter when a market cart with an article on the shelf thereof passes along said aisle.

2. A detection system according to claim 1, said sensing means also being arranged to be actuated by the passage along said aisle of such a market cart, said sensing means comprising a first sensor positioned for actuation upon the passage of such a market cart and a second sensor positioned for actuation upon the passage of an article carried on the lower shelf of such a market cart, said discriminating means actuating said signal means when both said first and second sensors are actuated.

3. A detection system according to claim 2, wherein said first and second sensors are positioned to provide a sensing zone extending across said aisle, said first sensor comprising a pair of sensors spaced apart lengthwise of said aisle, said discriminating means actuating said signal means only when said pair of sensors and said second sensor are actuated.

4. A detection system according to claim 2, wherein said first and second sensors are positioned to provide a sensing zone extending across said aisle, said sensing means including a third sensor positioned for actuation by a person passing through said zone, said third sensor being positioned so as not to be actuated by passage of a market cart through said zone, said discriminating means actuating said signal means only when said first and second sensors are actuated and said third sensor is unactuated.

5. A detection system according to claim 4, wherein said first sensor comprises a pair of sensors spaced apart lengthwise of said aisle, said discriminating means actuating said signal means only when both of said longitudinal spaced sensors and said second sensors are actuated.

6. A detection system according to claim 4, wherein said first, second and third sensors are positioned in vertically spaced relation, said third sensor being spaced between said first and second sensors.

7. A detection system according to claim 6, in combination with a shopping cart having a basket, a lower shelf below said basket and an opaque side portion along said basket, said first sensor being positioned adjacent said aisle at the height of said opaque basket side portion, said third sensor being positioned adjacent said aisle at a height a little below said opaque side portion and well above said lower shelf, so as not to be actuated by articles on said lower shelf, said second sensor being positioned adjacent said aisle at a height a little above said lower shelf so as to be actuated by a package thereon.

8. A detection system according to claim 7, wherein said second and third sensors are vertically alined, said first sensor comprising a pair of horizontally alined sensors and offset on opposite sides of said second and third sensors.

9. A detection system as set forth in claim 8, wherein said sensors comprise photoelectric cells and light sources operatively alined therewith.

10. In a system for detecting packages on the lower shelf of a market cart of the type having a basket and a shelf below the basket, means defining an aisle for the passage of such carts, signal means, radiation sensitive sensing means arranged beside said aisle to be actuated by the passage along said aisle of an article on the lower shelf of such a cart, means including said sensing means operable to discriminate between a cart with such an article and a person passing along said aisle, said discriminating means being arranged in controlling relation to said signal means to actuate the latter when a cart with an article on the lower shelf thereof passes along said aisle.

11. A detection system as set forth in claim 10, wherein said discriminating means includes other sensing means arranged beside said aisle in vertically spaced relation to said first-mentioned sensing means to be actuated by the passage along said aisle of a person while normally not being actuated by the passage along said aisle of an article on the lower shelf of such a cart, said discriminating means actuating said signal means only when said first-mentioned sensing means are actuated and said other sensing means are unactuated.

12. A detection system as set forth in claim 11, wherein said other sensing means are positioned below said first-mentioned sensing means.

13. A detection system as set forth in claim 12, wherein said first-mentioned sensing means comprise a pair of sensors spaced apart lengthwise of said aisle at a level above the lower shelf of such a cart and said other sensing means comprise a pair of sensors spaced apart lengthwise of said aisle at a level below the lower shelf of such a cart.

14. A detection system as set forth in claim 12, wherein said discriminating means include a proximity sensor responsive to the presence of such a cart in said aisle.

15. A detection system as set forth in claim 10, wherein said sensing means comprise a photoelectric cell and a light source operatively alined therewith.

16. A detection system as set forth in claim 10, wherein said discriminating means include a proximity sensor actuated by the presence of such a cart.

17. A detection system as set forth in claim 16, wherein said proximity sensor is of the electromagnetic type.

References Cited

UNITED STATES PATENTS

| | | | |
|---|---|---|---|
| 2,918,294 | 12/1959 | Hennion | 340—280 |
| 3,051,936 | 8/1962 | Finger et al. | 340—280 |
| 3,157,871 | 11/1964 | Umanoff | 340—280 |
| 3,349,905 | 10/1967 | Crawford | 250—223 |

WALTER STOLWEIN, Primary Examiner

U.S. Cl. X.R.

340—280

PO-1050
(5/69)

UNITED STATES PATENT OFFICE
CERTIFICATE OF CORRECTION

Patent No. 3,457,423     Dated July 22, 1969

Inventor(s) Oscar W. Graveley

It is certified that error appears in the above-identified patent and that said Letters Patent are hereby corrected as shown below:

In the drawings, the inventor's name appearing at the top of each sheet of drawing should be --O. W. Graveley--.

Column 1, in the heading, the inventor's name should be spelled --Oscar W. Graveley--, and the name of the assignee should read --Niagara Frontier Services, Inc.--.

SIGNED AND
SEALED
APR 14 1970

(SEAL)
Attest:

Edward M. Fletcher, Jr.
Attesting Officer

WILLIAM E. SCHUYLER, JR.
Commissioner of Patents